Nov. 4, 1947.　　　　W. R. MERCER　　　　2,430,357
FREQUENCY MODULATION DISTANCE DETERMINING SYSTEM
Filed March 2, 1944
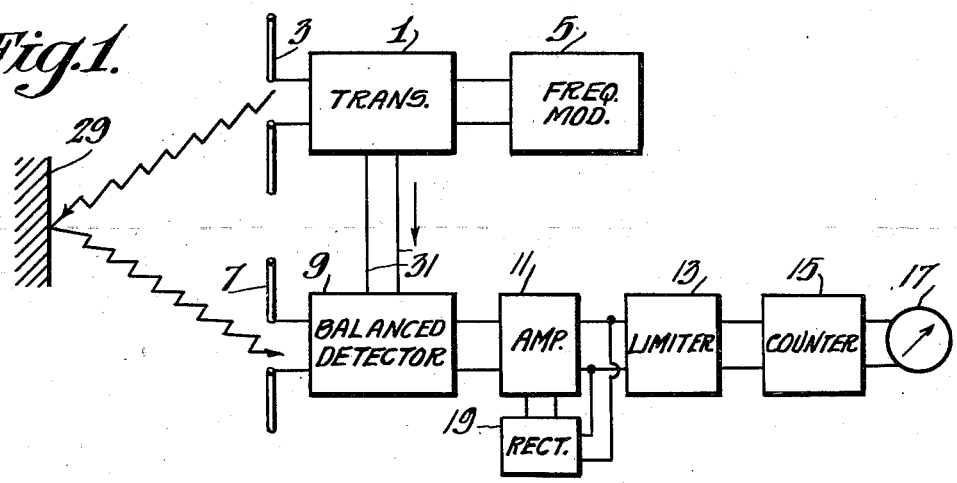
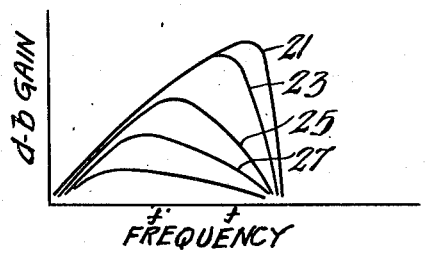
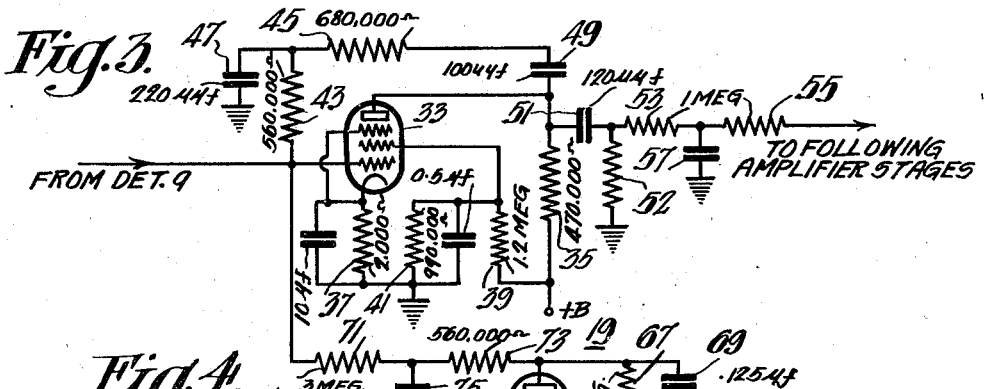
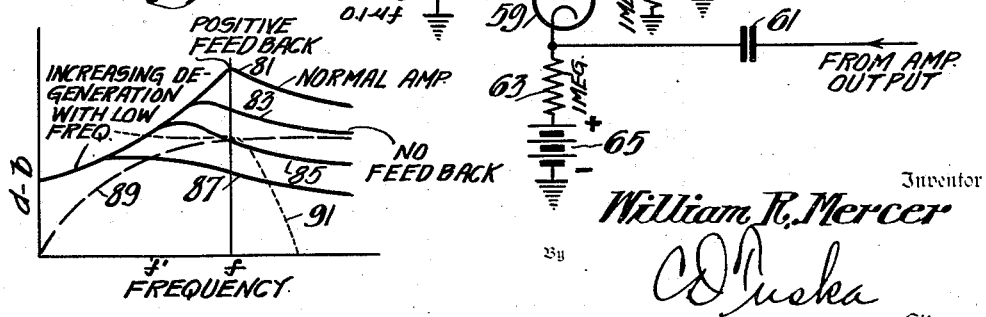
Inventor
William R. Mercer
By
C. D. Tuska
Attorney Patented Nov. 4, 1947

2,430,357

UNITED STATES PATENT OFFICE 2,430,357

FREQUENCY MODULATION DISTANCE DETERMINING SYSTEM

William R. Mercer, Hightstown, N. J., assignor to Radio Corporation of America, a corporation of Delaware Application March 2, 1944, Serial No. 524,793

6 Claims. (Cl. 250—1.68)

1

This invention relates to radio distance measuring systems and more particularly to improvements in the art of measuring distances by reflection of frequency modulated signals. F-M distance measuring systems in general are well known to those skilled in the art, being described in Bentley Patent 2,011,392 and Espenscheid Patent 2,045,071. In these systems a radio wave that is radiated to a reflecting surface or object is cyclically frequency modulated. In a receiver which is located close to the point of radiation, the reflected signal is picked up and mixed or heterodyned with some of the frequency modulated signal received directly from the transmitter (the point of radiation). The resulting "difference frequency" is a measure of the distance from the transmitter to the reflecting surface or object, since this frequency is determined by the time required for the radiated signal to reach the reflecting object and return to the receiver.

The principal object of the present invention is to provide an improved method of and means for minimizing the effects of extraneous signals and random reflections upon the operation of systems of the described type.

Another object is to provide an improved method of and means for controlling the amplification of the "difference frequency signal" in accordance with the strength of the reflected signal or the frequency of the beat signal, or both, so as to provide discrimination against undesired signal components and noise.

These and other objects will become apparent to those skilled in the art upon consideration of the following description, with reference to the accompanying drawing, of which Figure 1 is a schematic block diagram of a F-M distance measuring system, Figure 2 is a group of curves illustrating variations in the frequency characteristic as a function of the output amplitude of one of the elements of the system of Figure 1, Figure 3 is a schematic circuit diagram of an amplifier providing the characteristics illustrated in Figure 2, and Figure 4 is a group of curves showing the effects of various components of the circuit of Figure 3.

Referring to Figure 1, a radio transmitter 1 is connected to an antenna 3 and to a frequency modulator 5. The modulator 5 may be of the type described in U. S. application Serial No. 471,003, filed January 1, 1943, by Sydney V. Perry, and entitled Capacity modulator unit. A receiving antenna 7 is connected to a balanced detector circuit 9 which may be of the type described

2 in U. S. application Serial No. 445,720, filed June 4, 1942, by R. C. Sanders, Jr., and entitled Frequency modulated altimeter or distance indicator, or which may be any type of beat frequency detector. The detector 9 is also connected to the transmitter 1. The output circuit of the detector 9 is connected to an amplifier 11, described in more detail hereinafter. The output circuit of the amplifier 11 is connected through a limiter circuit 13 to a frequency responsive circuit 15 such as an averaging cycle counter of the described type in U. S. Patent 2,228,367, issued January 14, 1941, to R. C. Sanders, Jr., and entitled Frequency meter. The output circuit of the counter 15 is connected to an indicator 17 such as a D.-C. meter or the like.

The amplifier 11 is provided with automatic gain control means including a rectifier 19 connected to its output circuit to provide a D.-C. control voltage for application to a grid bias circuit of the amplifier 11. The gain vs. frequency characteristic of the amplifier 11 at low signal levels, when the output of the rectifier 19 is substantially zero, is illustrated by the curve 21 of Figure 2. The gain increases substantially linearly (in db. per octave) with increase in frequency up to a frequency $f$ corresponding to the maximum distance which the equipment is to measure. Beyond this point the gain decreases sharply with increase in frequency. The curves 23, 25 and 27 illustrate successive gain vs. frequency characteristics provided by the amplifier 11 as its output increases, increasing the bias voltage supplied by the rectifier 19. With increase in output, the amplifier gain decreases relatively rapidly over the range of frequency $f'$ to $f$, and decreases relatively slowly over the range of frequency up to $f'$.

At frequencies above $f$, signals are all affected as if the circuit were simply an ordinary AVC. A signal in the region of $f'$ first causes a decrease in high frequency gain as shown by the successive curves 21, 23 and 25 thus discriminating against any signal of higher frequency than itself. Then as the amplitude becomes still greater, the signal itself is held from overloading the amplifier by AVC action.

A study of the first curve will show that the amplitude at transition from automatic response control to AVC action becomes progressively lower as the frequency goes up, approaching immediate AVC at the frequency $f$ of peak again.

In the operation of the system of Figure 1, the transmitter 1 produces a radio frequency output which is cyclically varied in frequency by the modulator 5. This output is radiated from the antenna 3 to a reflecting object 29 to which the distance is to be measured. Part of the energy radiated by the antenna 3 is reflected by the object 29 to the receiving antenna 7, where it is picked up and applied to the balanced detector 9. Energy is also applied to the detector 9 directly from the transmitter 1 through the connections 31. The output of the detector 9 includes a beat frequency voltage having a frequency equal to the instantaneous difference in frequency between the transmitted and received signals. Since the received signal is delayed with respect to the transmitted signal by the time required for the energy to travel from the antenna 3 to the reflector 29 and back to the receiving antenna 7, the frequency is proportional to the distance of the reflecting object 29 from the antennas.

The beat frequency output of the detector 9 is amplified by the amplifier 11, limited to a constant amplitude by the limiter 13 and applied to the counter circuit 15, which provides a D.-C. output proportional in magnitude to the beat frequency. The output of the counter 15 is applied to the meter 17, deflecting it in accordance with the distance to be indicated. When the distance of the reflecting object 29 is relatively great, the frequency of the beat signal is high and the amplitude is low owing to the usual attenuation of radio waves with distance. Extraneous signals or interference of relatively high amplitude and low frequency, if allowed to pass through the amplifier 11, may actuate the limiter 13 and the counter 15, causing the indicator 17 to provide an erratic or incorrect indication. However, as indicated by the curve 21 of Figure 2, the gain of the amplifier 11 under these conditions is relatively low at low frequencies, providing discrimination against undesired low frequency signal components.

As the distance to the reflecting object 29 is decreased, the frequency of the beat signal decreases and its amplitude increases causing an increase in the amplitude of the output of the amplifier 11, both because of less distance attenuation and more gain until the point of peak gain is passed. The input to the amplifier 11, however, may contain extraneous higher frequency components resulting, for example, from reflections from a more distant reflecting object. Under some conditions, these undesired higher frequency signal components may attain amplitudes of the same order as that of the desired relatively low frequency signal. These components tend to cause erratic operation of the counter 15, and incorrect or erratic indication by the meter 17, particularly if the gain of the amplifier 11 increases with increase in frequency. This effect is minimized or eliminated by the relatively rapid decrease in gain of the amplifier 11 over the higher frequency range with increase in output amplitude, as indicated by the curves 23, 25 and 27.

Referring to Figure 3, a preferred circuit arrangement for the amplifier 11 includes an electron discharge tube 33 of the pentode voltage amplifier type such as that commercially designated as 6SJ7. The tube 33 is provided with the usual anode load resistor 35 and a self-bias resistor 37, connected in the cathode circuit. Resistors 39 and 41, connected between the positive anode supply terminal B+ and ground, function as a voltage divider providing screen grid potential for the tube 33. The control grid of the tube 33 is connected to the output circuit of the detector 9, and through a network comprising resistors 43 and 45 and capacitors 47 and 49 to the anode of the tube 33. The anode of the tube 33 is coupled through a capacitor 51 and a low pass filter network comprising resistors 53 and 55 and capacitor 57 to the following stages (not shown) of the amplifier 11. A resistor 52 is connected from the capacitor 51 to ground.

The rectifier circuit 19 includes a tube 59 with its cathode circuit coupled through a capacitor 61 to the output circuit of the amplifier 11. The cathode of the tube 59 is also connected through a resistor 63 and a battery 65 to ground. The anode of the tube 59 is connected to a load resistor 67 shunted by capacitor 69, and through a filter comprising series resistors 71 and 73 and a shunt capacitor 75 to the control grid of the tube 33.

The network comprising the resistors 43 and 45 and capacitors 47 and 49, together with the output impedance of the detector 9, provides feedback from the anode to the grid of the tube 33. The constants of this network are such as to provide a minimum negative feedback, or slightly positive feedback, in the region of the upper frequency limit $f$ and negative feedback over the lower frequency range. The gain provided by the tube 33, with the feedback network, is illustrated by the curve 81 of Figure 4. As the bias applied to the tube 33 is increased, the gain changes as indicated by the successive curves 83, 85, and 87 in Figure 4. The action is that of ordinary automatic volume control operating in the less degenerated frequency range.

The resistor 52 and capacitor 51 are proportioned to cut the low frequency response, providing a transmission vs. frequency characteristic illustrated by the dash curve 89.

The low pass filter section comprising resistors 53 and 55 and capacitor 57, in conjunction with the input capacitance of the following amplifier stage, is designed to attenuate principally at frequencies above the frequency $f$, as illustrated by the dotted curve 91. This eliminates the sharp peaking of the overall gain curve at $f$ and provides a relatively sharp cutoff above this frequency. The combined effects of the transmission characteristics represented by the curves 89 and 91 are superimposed upon the gain characteristics of curves 81, 83, 85 and 87 to provide the overall gain vs. frequency curves 21, 23, 25 and 27, respectively (Figure 2).

The operation of the system of Figure 3 is as follows: When the amplitude of the input, and hence that of the output of the amplifier is low, the gain vs. frequency characteristic is substantially as illustrated by the curve 21 of Figure 2. This condition continues as long as the amplifier output peaks do not exceed the voltage of the battery 65 and the tube 59 remains non-conductive. As the output increases, the tube 59 becomes conductive during the negative half cycles, allowing current to flow through the resistor 67 and charging the capacitor 69 negatively with respect to ground potential. The storage action of the capacitor 69 together with the low pass characteristic of the filter 71, 73, 75 smooths the output of the tube 59 to a D.-C. voltage which increases in magnitude with increase in amplitude of the output of the amplifier. This voltage is applied as bias to the control grid of the tube 33, causing the gain to decrease accordingly. Throughout the negative feedback range zero to $f'$ the effect of the bias from the rectifier 19 is relatively slight since both the feedback and the gain decrease simultaneously. Over the range $f'$ to $f$ and more particularly in the zero or positive feedback region around $f$ the gain decreases more rapidly with increase in bias, causing the shape of the gain vs. frequency characteristic to change as indicated in Figure 2.

I claim as my invention:

1. In a radio distance measuring system including means for producing a voltage having a frequency related to the distance to be ascertained, an amplifier including input and output circuits, a feedback circuit including frequency selective means connected from said output circuit to said input circuit, rectifier means connected to said output circuit of said amplifier and means for controlling the gain of said amplifier in response to the output of said rectifier means.

2. The invention as set forth in claim 1 wherein said frequency selective means comprises impedance elements proportioned so as to provide negative feedback varying with frequency over the lower frequency portion of the range of operation of said amplifier, and positive feedback in the region of the upper limit of the frequency range of operation of said amplifier.

3. The invention as set forth in claim 1 wherein said amplifier includes coupling elements so proportioned as to provide a rising characteristic of gain vs. frequency.

4. The invention as set forth in claim 1 including means for biassing said rectifier circuit to prevent operation thereof except when the amplitude of the input thereto exceeds a predetermined value.

5. In a radio distance determining system including means for producing a voltage having frequency proportional to the distance to be ascertained, means for amplifying said voltage, said amplifier means having normally a transmission characteristic directly proportional to frequency, and means connected to said amplifier to automatically decrease the gain thereof at frequencies in the region of the upper limit of the transmission range, in accordance with a predetermined function of the amplitude of the output of said amplifier means.

6. In a radio distance measuring system including means for transmitting a frequency modulated signal, receiving said signal after reflection, and combining said transmitted and received signals to provide a beat signal, an amplifier including an electron discharge tube provided with an anode, a cathode, and a control grid, means for applying said beat signal to said control grid, a feedback circuit connected from said anode to said control grid and including frequency selective means whereby the phase shift and the attenuation of the signal fed back through said circuit are predetermined functions of the frequency of said beat signal, a rectifier circuit coupled to the output circuit of said amplifier, and means for applying the output of said rectifier circuit to said control grid to control the bias thereon as a predetermined function of the amplitude of the output of said amplifier.

WILLIAM R. MERCER.

REFERENCES CITED

The following references are of record in the file of this patent:

UNITED STATES PATENTS

| Number | Name | Date |
| --- | --- | --- |
| 2,280,109 | Varela | Apr. 21, 1942 |
| 2,206,903 | Lane et al. | July 9, 1940 |
| 2,268,587 | Guanella | Jan. 6, 1942 |